May 14, 1935. J. E. SMITH 2,001,160
PERCOLATOR CONSTRUCTION
Filed Feb. 23, 1932
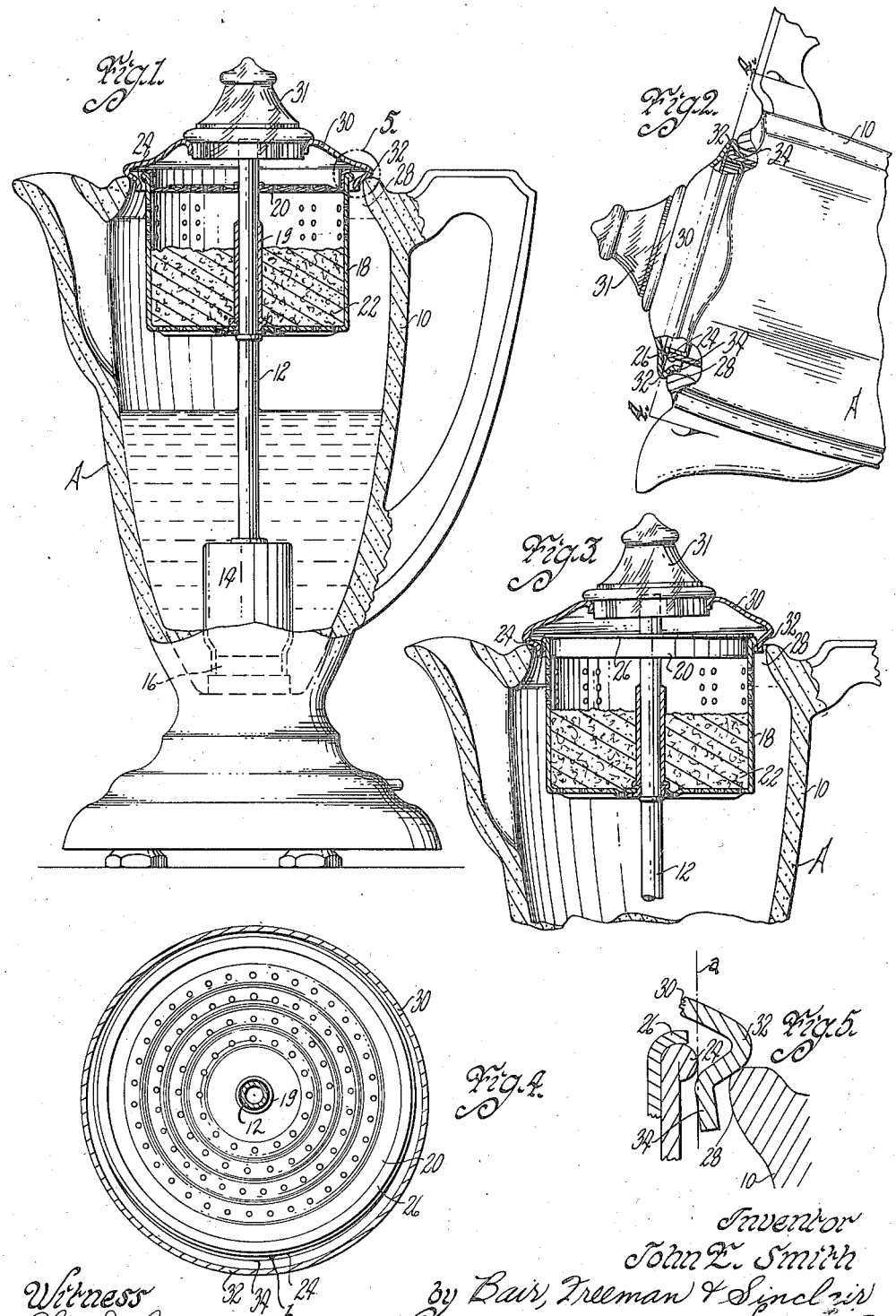
Inventor
John E. Smith
by Bair, Freeman & Sinclair
Attorneys
Witness
Edw. Seeley Patented May 14, 1935

2,001,160

UNITED STATES PATENT OFFICE 2,001,160

PERCOLATOR CONSTRUCTION

John E. Smith, Belleville, Ill., assignor to Knapp-Monarch Company, Belleville, Ill., a corporation of Missouri Application February 23, 1932, Serial No. 594,607

4 Claims. (Cl. 53—3)

An object of my present invention is to provide a percolator construction in which a moulded container of ceramic or the like can be manufactured inexpensively and a cover can be provided therefor which frictionally engages a percolator cup in the container to prevent accidental falling of the cover from the container when it is tipped to pouring position.

A further object is to provide a percolator construction in which a rim around the opening in the top of the moulded container is dispensed with and the percolator cup and cover constructed to cooperate with each other in such a way that the percolator cup retains the cover in covering position relative to the container.

A further object is to provide the percolator cup with a peripheral bead and the cover with a downwardly extending flange slightly smaller internally than the external diameter of the bead so that in placing the cover on the cup it must be sprung over the bead and will hook on the bead when the percolator is subsequently tipped to pouring position.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation partly in section of a percolator embodying my construction.

Figure 2 is a side elevation of a portion of the percolator showing it tipped to pouring position, with parts broken away and other parts shown in section to illustrate the coaction of the cover with the percolator cup during the pouring operation.

Figure 3 is a sectional view somewhat similar to the upper portion of Figure 1 showing the cover being replaced or removed.

Figure 4 is a sectional view on the line 4—4 of Figure 2 showing how the parts of the cover and the cup coact during pouring operations; and Figure 5 is an enlarged sectional view of the portion in the circle 5 of Figure 1, showing the coaction and relative sizes of the parts of the percolator construction.

On the accompanying drawing, I have used the reference character A to indicate generally a percolator. The percolator A includes a container 10 for water or the like and has therein a percolator tube 12, upwardly through which the water is percolated because of energization of a heating element in the percolator in the ordinary manner. The percolator tube 12 is secured to a pressure chamber 14 and the chamber in turn is semi-permanently mounted in the container 10. For instance, it may be frictionally engaged with a shouldered projection 16 therein.

Mounted on the percolator tube 12 and removable therewith is a percolator cup 18. A perforated drip plate 20 surrounds the tube 12 above the coffee 22 in the percolator cup 18. The percolator cup 18 is provided with a peripheral bead 24 at its upper edge and the drip plate 20 has a flange 26 resting thereon. The plate 20, of course, is removable so that the coffee 22 can be placed in the cup 18 or removed therefrom, as desired.

The container 10 is provided with a circular opening 28 adapted to be covered by a cover 30.

The cover 30 has a bead 32 to rest on top of the portion of the container 10 immediately surrounding the opening 28 and has a flange 34 extending downwardly inside the opening. The flange 34 is substantially smaller in diameter than the interior diameter of the opening 28.

Heretofore it has been customary to use a formed metal ring around the opening 28 so that the cover 30 and its flange 34 could accurately fit and frictionally engage such a ring. The ring was cemented in place and was necessary because it was desirable that the cover 30 did not fall off when the container 10 was tipped to pouring position and the opening 28 could not be made perfect enough nor uniform enough throughout a series of percolators to fit the flange 34. I have, therefore, provided the flange 34 substantially smaller than the opening 28 and with its internal diameter slightly smaller than the external diameter of the bead 24 so that the cover 30 has to be forced over the bead when being placed in position on the percolator, as I will now describe. Such construction dispenses with the ring heretofore used and the attendant operations of cementing it in place.

In Figure 5 the cover 30 is centrally located with respect to the percolator cup 18 and it will be noted that a portion of the flange 34 projects inwardly from a line $a$ which coincides with the outer surface of the bead 24.

As shown in Figure 3, one side of the flange 34 (left side of Figure 3) can be placed in position first under the bead 24 and the opposite side of the flange 34 can then be swung downwardly over the bead 24. Thus the cover 30 must be forced into position and is not easily displaced from the percolator cup 18 and the container 10.

As shown in Figures 2 and 4, when the percolator is tipped to pouring position, the upper part of the flange 34 will engage under the bead 24 to prevent the cover 30 from falling off. In Figure 4, it will be noticed that there is a space b between the flange 34 and the bead 24 at the lower side of the figure. At the top side of the figure, however, the flange 34 is behind the bead 24 and in fact is illustrated as merging therebehind about one-third way up the figure.

In replacing or removing the cover 30, the parts would assume the position shown in Figure 4 and then when the cover is forced on or off, the flange 34 squeezes the bead 24 and actually distorts it to nearly take up the space b while the flange 34 snaps on or off the bead 24. It will be noted that the flange 34 is somewhat flared (see Figure 5) to facilitate forcing of the flange over the bead when the cover is being placed in position.

The cover 30, of course, has the ordinary glass spreader 31 for the water which is percolated from the tube 12 to impinge against.

The cover 30, of course, is loose relative to the opening 28 so that any unevenness in the contour of the opening will not affect the operation of the device and is also somewhat loose relative to the cup 18, but nevertheless will not fall therefrom as clearly illustrated in Figures 2 and 4. Even though the percolator A is tipped past horizontal, the bead 24 will retain the cover 30 in position and even if the cover slips relative to the bead it cannot come off of its own weight because of the flange 34 being smaller in diameter than the bead 24. To remove the cover, force has to be applied to it with the cover arranged at a slight angle relative to the bead 24, as clearly shown in Figure 3.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a percolator construction, a moulded container having an opening in the upper end thereof, a percolator cup therein having a peripheral bead at its upper end and a cover for the opening in the upper end of said container, said cover having a downwardly projecting flange fitted over said bead and having its lower edge contracted to a slightly smaller internal diameter than the external diameter of said bead whereby the cover is retained by said bead when said container is tipped to pouring position.

2. In a percolator construction, a moulded container having an opening in the upper end thereof, a percolator cup therein having a peripheral bead at its upper end and a cover for the opening in the upper end of said container, said cover having a downwardly projecting flange flared outwardly at its lower end and fitted over said bead and having its lower edge contracted to a slightly smaller internal diameter than the external diameter of said bead whereby the cover is retained by said bead when said container is tipped to pouring position.

3. In a percolator construction, a moulded container, a percolator cup therein and a cover for said container and fitting loosely relative thereto, said percolator cup having an annular bead at its upper end and said cover having a flange to engage under said annular bead when said container and said percolator cup are tipped to pouring position to prevent falling of said cover therefrom.

4. In a percolator construction, a moulded container, a percolator cup therein and a cover for said container and fitting loosely relative thereto, said percolator cup having a peripheral bead at its upper end, said cover having a flange normally positioned under said peripheral bead and removable therefrom only by forcing said flange up over said bead.

JOHN E. SMITH.